(12) United States Patent
Levine et al.

(10) Patent No.: US 10,225,997 B1
(45) Date of Patent: *Mar. 12, 2019

(54) SMART SPRINKLER SYSTEM AND METHOD

(71) Applicant: Michael R. Levine, Pinckney, MI (US)

(72) Inventors: Michael R. Levine, Pinckney, MI (US); Luke Dickens, Fortson, GA (US)

(73) Assignee: Michael R. Levine, Pinckney, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,784

(22) Filed: Oct. 21, 2016

Related U.S. Application Data

(63) Continuation-in-part of application No. 13/966,869, filed on Aug. 14, 2013, now Pat. No. 9,504,213.

(60) Provisional application No. 61/729,842, filed on Nov. 26, 2012.

(51) Int. Cl.
*A01G 25/16* (2006.01)
*G05B 19/042* (2006.01)
*G05B 19/048* (2006.01)

(52) U.S. Cl.
CPC ......... *A01G 25/165* (2013.01); *G05B 19/048* (2013.01); *G05B 19/0426* (2013.01); *G05B 2219/25419* (2013.01); *G05B 2219/2625* (2013.01)

(58) Field of Classification Search
CPC .......................... A01G 25/165; G05B 19/0426
See application file for complete search history.

(56) References Cited

U.S. PATENT DOCUMENTS

| 3,886,378 | A |   | 5/1975 | Morgan |
| 5,414,618 | A | * | 5/1995 | Mock ..................... A01G 25/16 239/70 |
| 5,761,312 | A |   | 6/1998 | Zelikovitz et al. |
| 6,314,340 | B1 |  | 11/2001 | Mecham |

(Continued)

FOREIGN PATENT DOCUMENTS

| EP | 2201834 A1 | 6/2010 |
| EP | 2342965 A1 | 7/2011 |

(Continued)

OTHER PUBLICATIONS http://www.rainbird.com/landscape/products/controllers/RSD.htm.
http://rayshobby.net/opensprinkler/.

*Primary Examiner* — Vincent H Tran
(74) *Attorney, Agent, or Firm* — The Concept Law Grroup, PA; Scott D. Smiley; Scott M. Garrett

(57) ABSTRACT

A sprinkler system is controlled to ensure that a given geographic area receives sufficient watering without being over-watered. The sprinkler system, capable of being programmed to deliver a desired amount of water in accordance with a desired daily watering schedule, is programmed to deliver the desired amount of water every day unless interrupted. Rainfall information is received, and a signal is sent to interrupt the sprinkler system, causing the sprinkler system to: a) follow a predetermined watering schedule when there is no rain, in which case the sprinkler system delivers the desired amount of water following a predetermined number of days, n, without watering, or b) increase n by 1 or more days if the rainfall information indicates at least one significant rain event capable of providing the desired amount of water, and c) return to a) when n expires.

65 Claims, 6 Drawing Sheets

(56) References Cited

U.S. PATENT DOCUMENTS

| | | | |
|---|---|---|---|
| 6,850,819 B1 | 2/2005 | Townsend | |
| 7,883,029 B2 | 2/2011 | Chalemin et al. | |
| 7,949,433 B2 | 5/2011 | Hern et al. | |
| 9,299,029 B1* | 3/2016 | Kim | G06N 5/04 |
| 9,504,213 B2* | 11/2016 | Levine | A01G 25/16 |
| 2003/0093159 A1 | 5/2003 | Sieminski et al. | |
| 2005/0171646 A1* | 8/2005 | Miller | A01G 25/16 |
| | | | 700/284 |
| 2005/0273205 A1 | 12/2005 | Nickerson et al. | |
| 2006/0100747 A1 | 5/2006 | Runge et al. | |
| 2006/0202051 A1* | 9/2006 | Parsons | A01G 25/16 |
| | | | 239/69 |
| 2007/0293990 A1 | 12/2007 | Alexanain | |
| 2008/0027586 A1 | 1/2008 | Hem et al. | |
| 2008/0147205 A1 | 6/2008 | Ollis et al. | |
| 2008/0234870 A1* | 9/2008 | Chalemin | A01G 25/167 |
| | | | 700/284 |
| 2009/0316671 A1 | 12/2009 | Rolf et al. | |
| 2010/0179701 A1* | 7/2010 | Gilbert | A01G 25/16 |
| | | | 700/284 |
| 2010/0301133 A1* | 12/2010 | Altieri | A01G 25/167 |
| | | | 239/99 |
| 2011/0093123 A1* | 4/2011 | Alexanian | A01G 25/16 |
| | | | 700/284 |
| 2011/0224836 A1 | 9/2011 | Hern et al. | |
| 2011/0237227 A1 | 9/2011 | Kemery et al. | |
| 2012/0035898 A1 | 2/2012 | Repelli et al. | |
| 2012/0041606 A1* | 2/2012 | Standerfer | A01G 25/16 |
| | | | 700/284 |
| 2012/0072036 A1* | 3/2012 | Piper | A01G 25/16 |
| | | | 700/284 |
| 2012/0215366 A1 | 8/2012 | Redmond et al. | |
| 2012/0229284 A1* | 9/2012 | Hern | A01G 25/167 |
| | | | 340/618 |
| 2012/0239211 A1 | 9/2012 | Walker et al. | |
| 2012/0259473 A1* | 10/2012 | Nickerson | A01G 25/16 |
| | | | 700/284 |
| 2012/0286062 A1* | 11/2012 | Sicotte | A62C 37/00 |
| | | | 239/71 |
| 2013/0035774 A1* | 2/2013 | Warren | A01G 25/167 |
| | | | 700/90 |

FOREIGN PATENT DOCUMENTS

| | | |
|---|---|---|
| EP | 2354878 A1 | 8/2011 |
| WO | 1999048354 A1 | 9/1999 |
| WO | 2005062961 A2 | 7/2005 |
| WO | 2007149949 A1 | 12/2007 |
| WO | 2009002757 A2 | 12/2008 |
| WO | 2011044289 A1 | 4/2011 |

* cited by examiner

SMART SPRINKLER SYSTEM AND METHOD

CROSS REFERENCE TO RELATED APPLICATIONS

This application claims priority to U.S. Provisional Patent Application Ser. No. 61/729,842, filed Nov. 26, 2012, and U.S. Non-Provisional applicant Ser. No. 13/966,869, filed Aug. 14, 2013, claiming priority to the U.S. Provisional Patent Application Ser. No. 61/729,842, the entire contents of each of which are hereby incorporated by reference.

FIELD OF THE INVENTION

This invention relates generally to the irrigation of land and, in particular, to a sprinkler system and method that uses radar data to provide adequate watering without over-watering. The invention relies on the existing sprinkler timer to perform the daily watering schedule (in the preferred embodiment), but conserves water by having the capability to perform automatic watering on any day, without any fixed pattern, thereby reducing the frequency of days that watering occurs.

BACKGROUND OF THE INVENTION

Modern irrigation systems, such as lawn sprinklers, usually include multiple watering zones. The user typically sets an irrigation control timer to set the frequency and duration of watering for those zones. At the pre-programmed time, the system cycles through the various watering zones.

Simple irrigation systems often waste water because the programmed watering time occurs immediately before, during or after a natural rainstorm event. More expensive systems address this problem by employing a rain sensor. After a set amount of rain has fallen, the sensor engages a switch that will prevent the timer from watering (e.g., http://www.rainbird.com/landscape/products/controllers/RSD.htm). U.S. Pat. No. 7,949,433 describes the use of a rain threshold to enable or disable power to an irrigation system. An interface unit is connected in series with the common line of the sprinkler activation lines. When the interface unit determines or receives an indication that a rain threshold has been exceeded and/or that other criteria have been met, the interface unit inhibits the switching device, breaking the common line. This effectively disables all electrical signals via the activation lines to the valves, until the switch is closed. In this way, the irrigation control timer 30 is not aware that the watering has been interrupted or overridden.

One significant drawback of rain sensors is that, since they have no weather prediction or forecast capability, they ignore rainfall that occurs soon (i.e., within 24-hours) after the programmed watering time. If this happens, over-watering occurs and water is wasted. The cost of water in numerous urban areas has led to more sophisticated and purportedly effective irrigation solutions, some of which take weather predictions and forecasting into account.

Another drawback of rain sensors is that they are restricted to watering only on a fixed pattern of days (usually on specific days of the week, if not every day) set by the sprinkler timer. This is inherently sub-optimal, since watering may be forced to occur shortly after a recent rain event, in order to ensure that enough watering occurs before the next allowable watering day.

U.S. Pat. No. 7,883,029 discloses an irrigation system including a radio transmitter station that transmits weather prediction information to a geographic region that includes multiple geographic sub-regions. The weather prediction information includes a respective geographic sub-region code for each of the geographic sub-regions for which a weather forecast predicts rain within a predetermined time period. An irrigation apparatus in a particular sub-region activates to water a watering zone at a schedule time. However, if the irrigation apparatus receives the sub-region code for the particular sub-region where the irrigation apparatus is located, the irrigation apparatus does not immediately activate to water the watering zone in one embodiment. The transmitter station may transmit both program content and data content on a common radio frequency signal wherein the data content includes the weather prediction information.

The use of weather information via the Internet for sprinkler control has been suggested before, as in the OpenSprinkler project: http://rayshobby.net/?page id=160 & http://rayshobby.net/blog/?p1500. Other systems take advantage of radar data. U.S. Pat. No. 6,850,819, for example, resides in an irrigation control system that comprises a meter to measure one or more weather conditions, a monitor to examine rainfall data derived from radar scanning and to extract data which is representative of the scanned rainfall; and a controller to calculate a moisture content value, a predetermined moisture content value, and regulate irrigation in accordance with the computed values.

SUMMARY OF THE INVENTION

This invention resides in a system and method for controlling a sprinkler system to ensure that a given geographic area receives sufficient watering without being over-watered. In the preferred embodiments, the sprinkler system is capable of being programmed to deliver a desired amount of water in accordance with a desired daily watering schedule comprised of watering zone start times and watering zone durations.

In accordance with the method, the sprinkler system is programmed to deliver the desired amount of water every day unless interrupted. Rainfall information associated with the geographical location of the sprinkler system is received, and a signal is sent to interrupt the sprinkler system, causing the sprinkler system to:

a) follow a predetermined watering schedule when there is no rain, in which case the sprinkler system delivers the desired amount of water following a predetermined number of days, n, without watering, or b) increase n by 1 or more days if the rainfall information indicates at least one significant rain event capable of providing the desired amount of water, and c) return to a) when n expires.

Watering decisions are typically sent to the sprinkler system on a daily basis, and the predetermined watering schedule is delayed by one full day (i.e., 24-hrs), if the rainfall information indicates a significant rain event. The predetermined watering schedule may have the form: do not water for x days, then water on the next day; and the delay of the predetermined watering schedule has the form: do not water for x+n days, then water on the next day, where n is between 1 and 7. Multiple no-rain watering schedules may be in effect for different daily time periods. In the preferred embodiment, the signal to interrupt the sprinkler system is sent from a geographically remote site or service center, enabling a plurality of systems to be controlled in the same or different geographic locations.

The rainfall information may be historical, forecast, or a combination thereof. As an example, the predetermined watering schedule may be delayed if the rainfall information indicates that the desired amount of water has been received in the last n days, where n is between 1 and 7. As another example, the predetermined watering schedule may be delayed if the rainfall information forecasts a high probability that the desired amount of water will be received as rainfall in the next n hours, wherein n is between 1 and 24. As a more specific example, the predetermined watering schedule may be delayed if an area forecast indicates that there is a strong probability of a significant rain event in the next 24 hours, or if weather radar indicates an existing or oncoming storm. The predetermined watering schedule may be immediately delayed upon the occurrence of a significant rain event.

The sprinkler system may be an electromechanical type sprinkler system including a rotating dial with adjustable pins, in which case the pins are adjusted to deliver the desired amount of water every day. Alternatively, the sprinkler system may be an electronic sprinkler system including a programming interface, in which case the system is reprogrammed through the interface to deliver the desired amount of water every day. The electronic sprinkler system may include a programming interface enabling a plurality of different timing programs to be set for different watering zones, in which case the different timing programs, for different times of the day, may be reprogrammed through the interface to deliver the desired amount of water to each of the different watering zones on a daily basis.

The rainfall information is radar-based, and/or may use soil moisture data associated with the geographic area and/or rain gauge data associated with the geographic area. In any case, the rainfall information may be derived through the Internet. Zip Code information may be used to determine the geographic area associated with the sprinkler system.

If the sprinkler system has a rain sensor input, an interface may be provided to the rain sensor input to follow or delay the predetermined watering schedule in accordance with the signal received to interrupt the sprinkler system. In the preferred embodiments, the invention inhibits or allows electrical power to a pre-existing electromechanical or electronic sprinkler timer. The control apparatus may connect directly to the sprinkler system through a rain sensor input. In this case, only power to the solenoids is interrupted. Otherwise, the apparatus is connected to the sprinkler system through the electrical wiring providing power to the sprinkler timer unit, and power to both the timer and the solenoids is interrupted. Thus, as disclosed herein, unless otherwise specified, when referring to electrical power to the sprinkler system, it is inferred to mean either power to only the solenoids of the sprinkler system, or power to both the solenoids and the timer of the sprinkler system.

The signal to interrupt the sprinkler system may be delivered through the Internet. In accordance with one disclosed example, the signal from a remote site may be sent to an electronic module at the location of the sprinkler system through the Internet, then wirelessly transmitted from the electronic module to the sprinkler system, or wirelessly transmitted the signal from the electronic module to a sprinkler system power controller via WiFi. In an alternative embodiment, the signal to the sprinkler system may be sent from a remote site using a dial-up telephone connection, with Caller-ID optionally being used for identification purposes.

The desired amount of water, the predetermined watering schedule, or both, may be determined through empirical observation associated with the effectiveness of the sprinkler system and/or determined through soil type, vegetation type, climate or other information associated with the geographic area.

A system for controlling a sprinkler system capable of being programmed to deliver a desired amount of water in accordance with a desired daily watering schedule comprised of watering zone start times and watering zone durations, and wherein the sprinkler system is intentionally programmed to deliver the desired amount of water every day unless interrupted, comprises a processor receiving rainfall information associated with the geographical location of the sprinkler system, and a communications interface connected to the processor, the communications interface being operative to send a signal to the sprinkler system to interrupt the sprinkler system, causing the sprinkler system to:

a) follow a predetermined watering schedule when there is no rain, in which case the sprinkler system delivers the desired amount of water following a predetermined number of days, n, without watering, or b) increase n by 1 or more days if the rainfall information indicates at least one significant rain event capable of providing the desired amount of water, and c) return to a) when n expires.

In accordance with a method aspect, the sprinkler timer is set to water every day, regardless of whether the timing is set mechanically (i.e., via pins) or electronically. The system then automatically inhibits watering for any given 24-hour period by interrupting power to the sprinkler system based on the acquired rainfall information.

DETAILED DESCRIPTION OF THE INVENTION

This invention resides in a Smart Sprinkler System (SSS) that uses rainfall information, from radar and other weather data obtained from the Internet, to send a control signal to a sprinkler system power controller that will either interrupt or enable power to the sprinkler system. No local weather sensors or intelligence are required at the sprinkler system site and the device may be used in conjunction with existing sprinkler timers. From the Internet, historical radar and other weather information, in addition to forecast precipitation information is used to make a decision to enable or disable the solenoids of the sprinkler system. An algorithm which compares the rainfall amount of the last several days and predicted rainfall for the next day(s), to a required rainfall threshold, will determine the decision to water. There is one sprinkler system power controller per sprinkler timer. The algorithm decision (enable power=water, or disable power=do not water) is transmitted to each sprinkler power controller, which then enables/disables watering accordingly by controlling sprinkler system power.

System Overview

Figure 1:
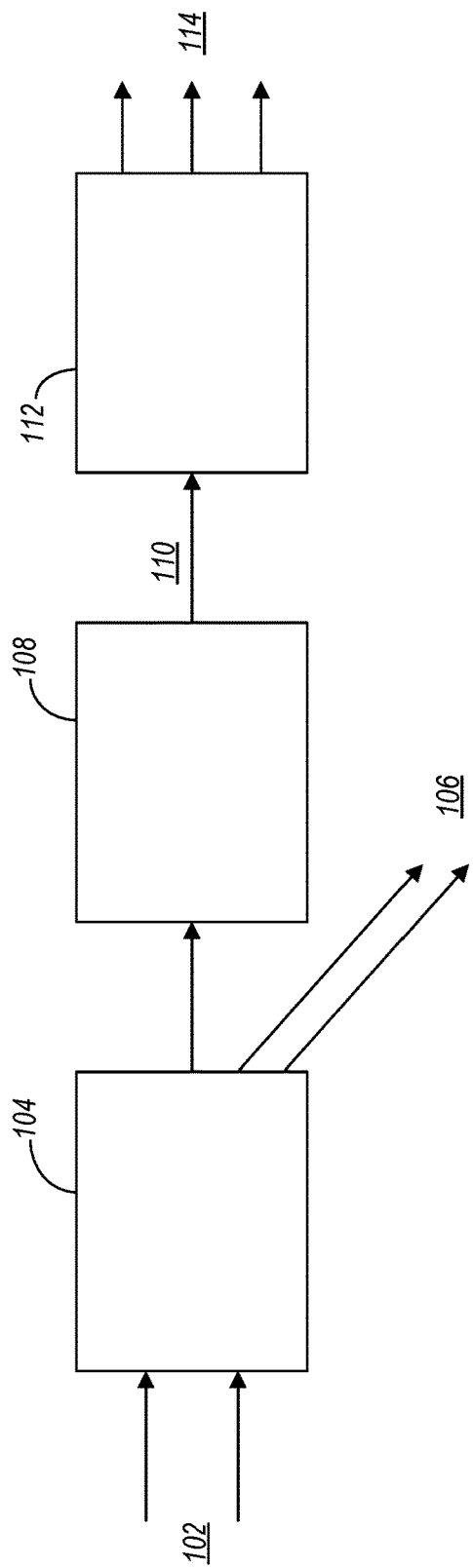
FIG. 1 is a block diagram that illustrates an overview of the system, in accordance with some embodiments.

FIG. 1 is a block diagram that illustrates an overview of the system. In broad and general terms, the system includes at least one service center 104 receiving weather information 102. The service center 104 can send out sprinkler ON/OFF (i.e., activation/deactivation) signals 106 to a plurality of sprinkler controllers 108. Alternatively, the service center 104 can send out schedule data to a smart controller unit at the sprinkler controller site that can implement the schedule of watering/not watering. The sprinkler controllers, in turn, enable/disable power according to the ON/OFF signals 110 to the sprinkler solenoids (or both solenoids and timer) 112 operative to activate sprinkler zones 114. Each of these subsystems will now be described in further detail, as there are multiple alternative embodiments in each case.

Service Center

The intelligence of the SSS resides at the Service Center 104. It is anticipated that there will be at least one service center 104 associated with a given geographical area, and that each geographical area will include numerous commercial or residential sprinkler timers controlled by each center. While a given Service Center 104 may include human personnel, in the preferred embodiment, all control signals or schedules are sent out entirely on an automated basis.

At each Service Center 104, local radar rainfall data, forecast information, and other weather data are collected from the Internet on a daily basis. The radar images are converted to rainfall rates using known conversion methods. As discussed elsewhere herein, the predicted rates may be corrected by available rain gauge data and/or other weather information. Historical and predicted rainfall information are used to decide whether or not to allow watering at each location that is timer-controlled by the system, and the decisions are delivered via signals or schedules 106, shown in FIG. 1.

A primary source of precipitation information for a user's site will be from radar images for the user's sprinkler's location, obtained over the Internet. There are now different types of radar images available, and the invention is not limited in terms of acquisition technology. Some images use Base Reflectivity, which is a display of echo intensity (reflectivity) measured in dBZ (decibels of Z, where Z represents the energy reflected back to the radar). Base Reflectivity images are available at several different elevation angles (tilts) of the antenna and are used to detect precipitation, evaluate storm structure, locate atmospheric boundaries and determine hail potential. Other image types use Composite Reflectivity, which displays maximum echo intensity (reflectivity) from any elevation angle at every range from the radar; One-Hour Precipitation, which is an image of estimated one-hour precipitation accumulation on a 1.1 nm by 1 degree grid, is used to assess rainfall intensities for flash flood warnings, urban flood statements and special weather statements; Storm Total Precipitation is an estimate of accumulated rainfall, continuously updated, since the last one-hour break in precipitation. This product is used to locate flood potential over urban or rural areas, estimate total basin runoff and provide rainfall accumulations for the duration of the event; and services similar to StormTrac (cbs12.com/weather/features/animating-radar) which provides near-term prediction of where a rain cell will be in the next several hours.

Figure 2:
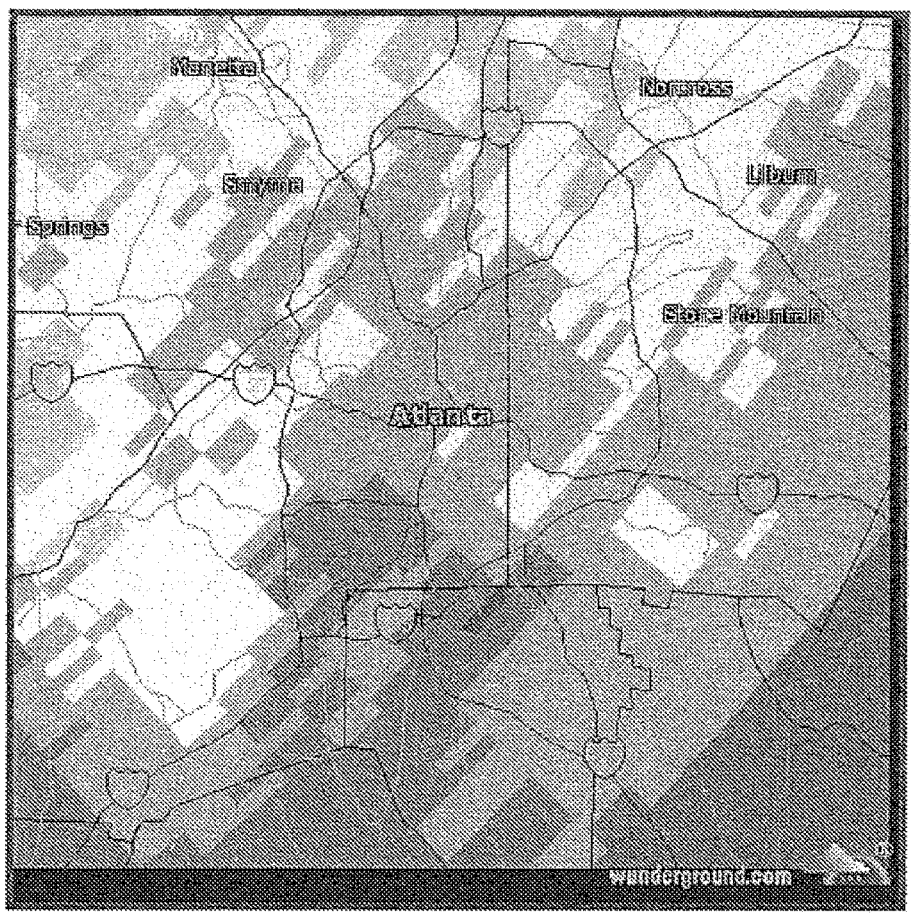
FIG. 2 is a sample radar image from the Weather Underground website, in accordance with some embodiments.
Figure 3:
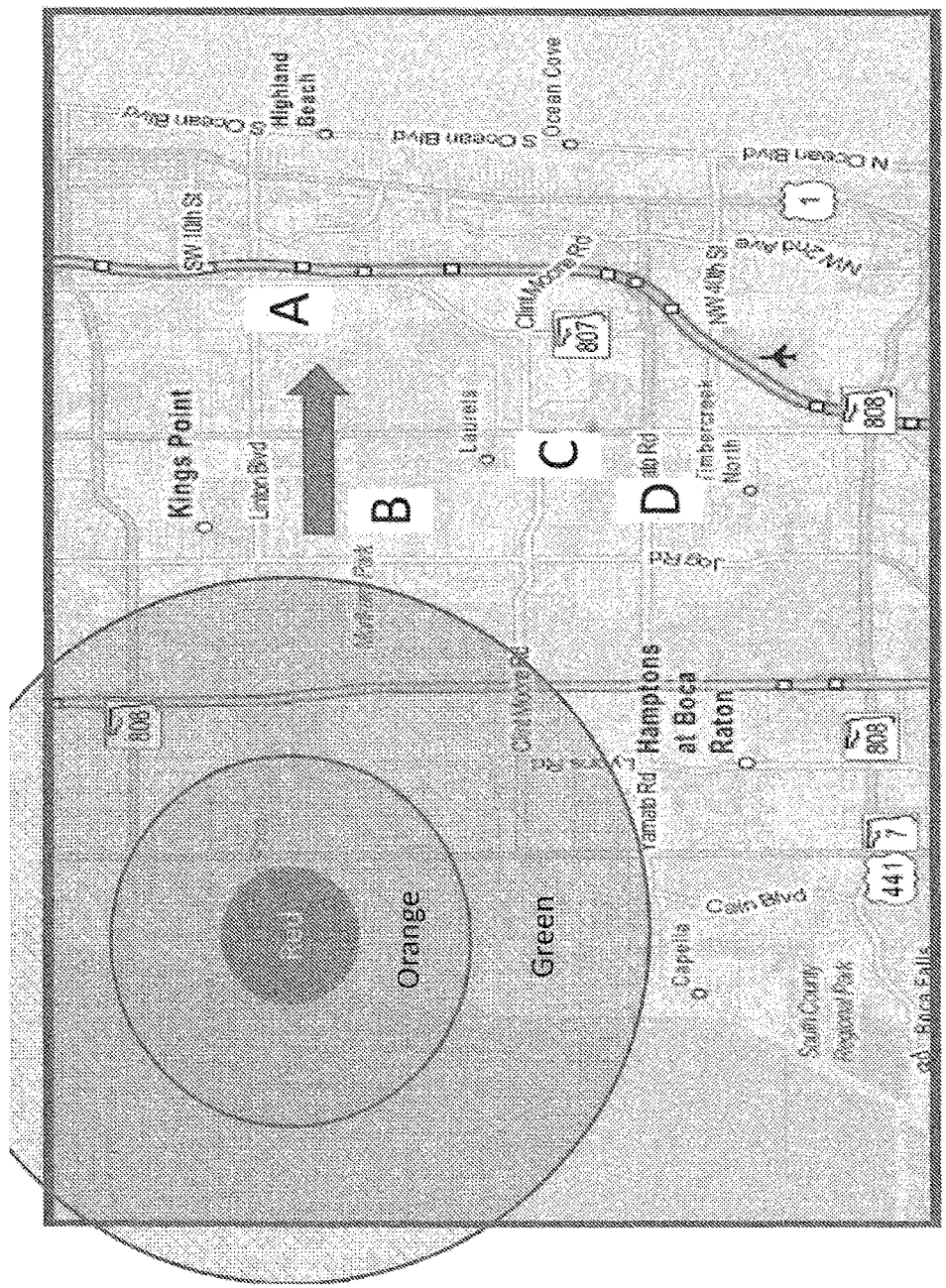
FIG. 3 illustrates how each radar frame represents reflectivity from the sky above a particular geographic location, in accordance with some embodiments.

Again, the invention is not limited in terms of the radar technology, and may use any available imagery or radar weather data, including yet-to-be developed, higher-resolution modalities. Using Base Reflectivity as an example, the input to the system is the analyzed radar image (dBZ intensity), with the output being average color which is indicative of estimated rainfall. The colors of the pixel(s) in the images represent radar reflectivity values measured in dBZ. These values are then converted into rainfall rates (see: desktopdoppler.com/help/nws-nextrad.htm). FIG. 2 is a sample radar image from the Weather Underground website (www.wunderground.com). On a periodic basis, for example every 5 minutes, a frame of data is downloaded from the website, and each frame represents the radar reflectivity from the sky above a particular geographic location, as shown in FIG. 3.

Figure 4:
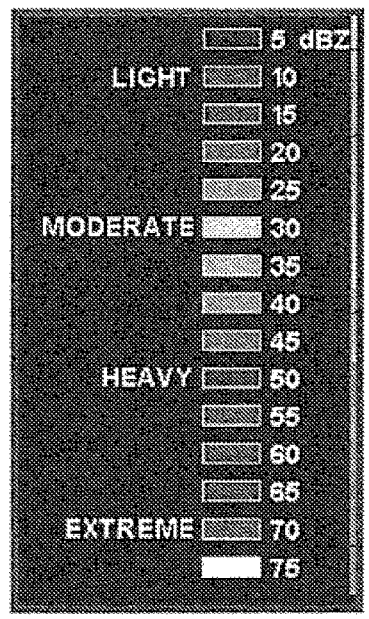
FIG. 4 illustrates how each radar frame represents reflectivity from the sky above a particular geographic location.

FIG. 4 is the NOAA's table of conversion from dbZ to rainfall. Each color translates dBZ to a numerical value, and each numerical value is added to the daily summary. In accordance with the invention, each day, the system generates an estimated rainfall for a plurality of geographical regions.

Zip Code Information

The user's Zip Code (Zip+4) can be used to identify the user's location and default soil/grass type.

Decision Algorithm

The algorithm, in part, makes decisions based on recent watering events, or whether or not a quantum of rain has recently fallen or is predicted to occur within 24-hrs. A quantum of rain is defined as the output of a typical sprinkler head during a watering event and is proportional to the duration of a watering event, and is a desired amount of water for the conditions and type of soil/grass being watered without over-watering. This value will be adjustable by the user according to individual watering desires. A combination of both historical and forecast precipitation (and other weather information) can be used to decide whether to water on a given day.

The sprinkler timer will be set to water every day of the week. This means that the system is not limited to a fixed pattern of watering and is able to water on any day, i.e. has a variable pattern. Because of the this capability, incorrect rain predictions have little real effect on watering efficiency, since watering will occur the following day, due to the lack of historical rain. In fact, it can be shown that this ability to water on any day is inherently superior to any system that has a fixed pattern of watering. To demonstrate this, consider a lawn that requires watering only once every seven days. Here is an illustration of watering frequency, comparing a system using a fixed pattern of watering vs. a system using a variable pattern of watering that can be shifted due to rainfall:

The following examples have the following parameters in common:

The area to be watered requires at least a quantum of water at least once every seven days.

The fixed pattern system is only permitted to water every seventh day.

The variable pattern system may water on any day.

Example 1

| Day: | 1 | 2 | 3 | 4 | 5 | 6 | 7 |
|---|---|---|---|---|---|---|---|
| Fixed: | Watering | | | | | | |
| Variable: | Watering | | | | | | |
| Day: | 8 | 9 | 10 | 11 | 12 | 13 | 14 |
| Fixed: | Watering | | | | | | |
| Variable: | Watering | | | | | | |
| Day: | 15 | 16 | 17 | 18 | 19 | 20 | 21 |
| Fixed: | Watering | | | | | | |
| Variable: | Watering | | | | | | |

Example 1 compares what would happen in both systems under drought conditions with no rain. The watering events are identical. This example illustrates that the variable pattern employed by the invention performs no worse than the fixed pattern under drought conditions.

Example 2

| Day: | 1 | 2 | 3 | 4 | 5 | 6 | 7 |
|---|---|---|---|---|---|---|---|
| Fixed: | Watering | | | | | | |
| Variable: | Watering | | | | | | |
| Day: | 8 | 9 | 10 | 11 | 12 | 13 | 14 |
| Fixed: | Watering | | | | | | |
| Variable: | Watering | | | | | | |
| Day: | 15 | 16 | 17 | 18 | 19 | 20 | 21 |
| Fixed: | Watering | | | | | | |
| Variable: | | | | Watering | | | |

In Example 2, it rained at least a quantum of water on the eleventh day. The fixed pattern system must water on the $15^{th}$ day, since the next opportunity to water would be on the $22^{nd}$ day, and that would result in an unacceptable period without water (i.e., 14 days). Since the variable pattern system can water on any day, it delays or shifts watering until the $18^{th}$ day, already an improvement over the fixed pattern system.

Example 3

| Day: | 1 | 2 | 3 | 4 | 5 | 6 | 7 |
|---|---|---|---|---|---|---|---|
| Fixed: | Watering | | | | | | |
| Variable: | Watering | | | | | | |
| Day: | 8 | 9 | 10 | 11 | 12 | 13 | 14 F |
| Fixed: | Watering | | | | | | |
| Variable: | | | | | | | |
| Day: | 15 | 16 | 17 | 18 | 19 | 20 | 21 |
| Fixed: | Watering | | | | | | |
| Variable: | | | | | | | |

In Example 3, on the $14^{th}$ day, rain was forecast for the $15^{th}$ day (indicated by the letter 'F'). The forecast was correct and it rained on the $15^{th}$ day. It is observed that the variable pattern system is able to skip watering on the $15^{th}$ day. This results in a delaying watering until the $22^{nd}$ day (not shown). The fixed pattern system must water on the $15^{th}$ day.

Example 4

| Day: | 1 | 2 | 3 | 4 | 5 | 6 | 7 |
|---|---|---|---|---|---|---|---|
| Fixed: | Watering | | | | | | |
| Variable: | Watering | | | | | | |
| Day: | 8 | 9 | 10 | 11 F | 12 | 13 | 14 F |
| Fixed: | Watering | | | | | | |
| Variable: | | | Watering | | | | |
| Day: | 15 | 16 | 17 | 18 | 19 | 20 | 21 |
| Fixed: | Watering | | | | | | |
| Variable: | | Watering | | | | | |

In Example 4, on the $14^{th}$ day, rain was forecast for the $15^{th}$ day (indicated by the letter 'F'). The forecast was incorrect and it did not rain on the $15^{th}$ This is the worst-case scenario for the variable pattern system. It can be observed that the variable pattern algorithm skips watering on the $15^{th}$. However, watering occurs the following day due to the lack of previous rain, and prevents any practical adverse effect on the irrigated area. This is a "self-healing" property of the variable pattern. The fixed pattern system has no such self-healing capability, since it cannot water until the next scheduled watering day. The possibility of a missed forecast appears to show potential worse performance for the variable pattern system. In reality, however, the overall effect would be de minimus, due to the self-healing property. The water savings resulting from the variable pattern system's capability to maximize delay in watering due to rain (shown in Example 2), a relatively frequent event, will dwarf any minimal savings lost due to the rare occurrence of an erroneous forecast.

The fact that all days are available for watering allows the algorithm to continually delay watering due to rain (or predicted rain) events, and can shift the required watering to the maximum number of days in the future. Thus if watering is scheduled to occur on the $15^{th}$ day of the month, and rain occurs on the $12^{th}$ day, the watering schedule will be shifted from the $15^{th}$ to the $19^{th}$ since the $19^{th}$ is seven days after the $12^{th}$ when natural watering occurred. If no more rain falls, then the next watering after the $19^{th}$ will occur on the $26^{th}$ and every seven days thereafter until another rain even occurs or is forecast to occur. The Fixed Pattern system cannot do this, since it cannot shift its schedule to perform watering on the optimal day. Therefore, in practice, the variable-shifting pattern system is superior to a fixed pattern system, and the fact that the system can water on any day makes the variable pattern system possible. The SSS requires that all pins be pulled on the wheel that sets the day-frequency of watering on the pre-existing electromechanical sprinkler timer (or the equivalent procedure performed on an electronic timer) to allow for the capability of watering on any day.

A simple example of the decision algorithm is:
IF an area forecast shows a high probability of at least a quantum of rain in the next 24 hours:
  Do not Water
OR ELSE IF a StormTrac radar indicates that a rain cell will cause a quantum of rain to fall on the user's location in the next 2 hrs:
  Do not Water
OR ELSE IF watering or rainfall has occurred in the past n days:
  Do not Water and Shift Watering Schedule
OR ELSE:
  Water In the algorithm above, the percentage value used for 'high probability' and the default quantum value may be adjusted as more empirical evidence is gathered. The value of n is the number of days that a quantum of rain has not fallen and has a default value of 2, however, it is also adjustable according to the user's desires. When rainfall has occurred, the watering schedule is shifted so that the next scheduled sprinkling will occur n days after the rainfall. The algorithm may also adjust the number of days to shift the watering schedule, proportional to the actual number of quanta of actual rainfall. Other relevant weather information (e.g., temperature, wind) and user information (e.g. soil type, grass type) could be incorporated into the decision algorithm.

Transmission of Control Signals to the Controller

In general, the algorithm decision uses rainfall data information, rain forecast and previous client recorded decisions as inputs to make the next-day decision for each client. Watering decisions are calculated per location, depending on location watering requirement, watering and rainfall history, and rainfall prediction/forecast. These decisions are recorded at the Service Center.

The Service Center then transmits the decision to each Sprinkler System Power Controller at the appropriate time, or configures a respective schedule for each Sprinkler System to be followed by each Sprinkler System. When this scheduled event (e.g., an email or a scheduled Google Calendar event) occurs it, in turn, triggers the Sprinkler Controller. This may be accomplished using a web service, such as IFTTT. In the some embodiments, exactly one ON or OFF signal is sent from the Service Center to each client site, every 24 hours, and zone timing is performed by the pre-existing sprinkler timer settings. In some embodiments a schedule can be forwarded to a Sprinkler System that is configured to receive, store, and implement a schedule whenever the schedule changes due to user input or rainfall.

Sprinkler System Power Controller (108)

In response to signals received form the Service Center 104, the Sprinkler System Power Controller 108 will inhibit or allow power to the solenoids (or both solenoids and timer) of a sprinkler system equipped with a pre-existing electronic or electromechanical sprinkler timer 112. The Sprinkler System Power Controller connects to the sprinkler system through the rain sensor inputs to the timer, if available. Otherwise, the Sprinkler System Power Controller will be connected to the sprinkler system through standard home circuitry wiring and will control power to the sprinkler system by interrupting the common wire. See http://water-heatertimer.org/How-to-wire-Intermatic-sprinkler-timers.html for examples of electromechanical sprinkler timers with and without rain sensor terminals.

Figure 5:
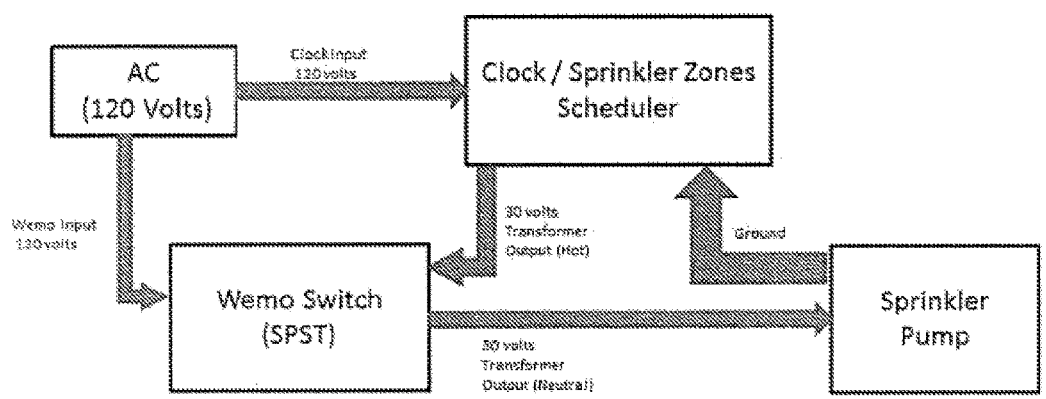
FIG. 5 is a block diagram showing the way in which a WeMo switch may be used to interrupt a sprinkler pump.
Figure 6:
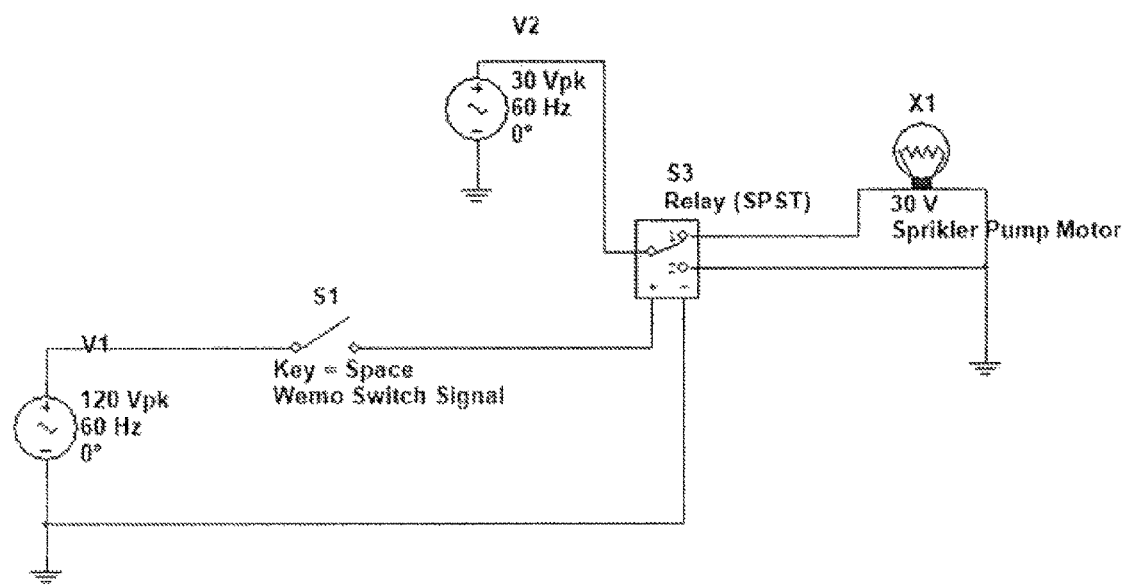
FIG. 6 is an electrical diagram of the block diagram of FIG. 5 showing the BelkinWeMo operating as a simple switch that opens or closes a relay.
Figure 7:
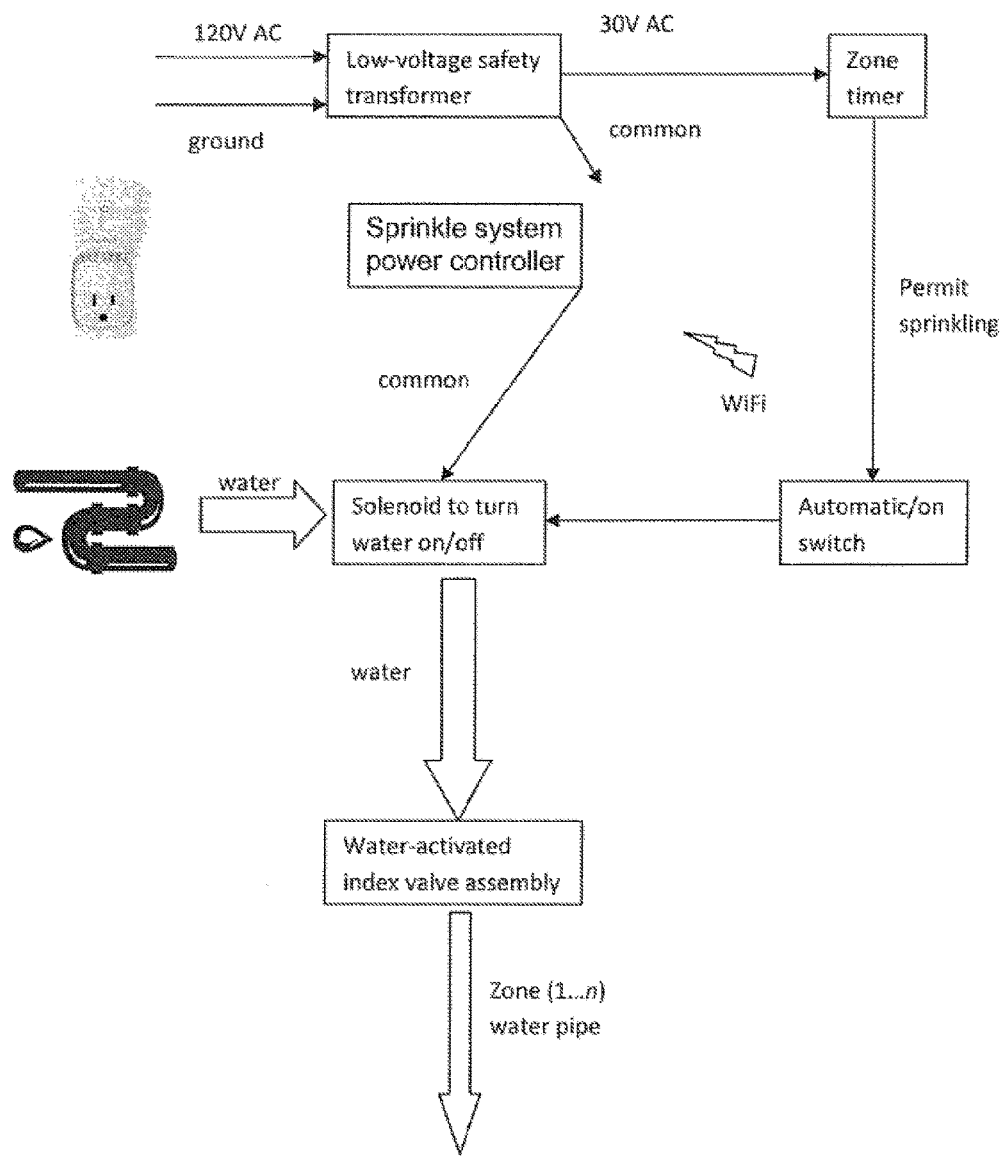
FIG. 7 illustrates the use of a WeMo switch that can interrupt the common wire.

An example of an off-the-shelf device that may be used as a Sprinkler System Power Controller is the BelkinWeMo (http://www.belkin.com/us/wemo-switch). It is designed to interrupt 110V power to a target device. It may be physically modified so that it can be directly tied into the rain sensor inputs of the sprinkler timer. FIG. 5 is a block diagram showing the way in which a WeMo switch may be used to interrupt a sprinkler pump. FIG. 6 is an electrical diagram of the block diagram of FIG. 5 showing the BelkinWeMo operating as a simple switch that opens or closes a relay. FIG. 7 illustrates the use of a WeMo switch that can interrupt the common wire.

Caller ID

To interrupt the sprinkler in accordance with a different aspect of the invention, CallerID may be used. In such embodiments, a message is sent from a particular phone number, and when the message is received at the Sprinkler Controller, recognition of that phone number enables the sprinkler system. The "content" of the message is immaterial. When the message is received again, recognition of that phone number disables the sprinkler system. If no signals are received in 24 hr. period, the system reverts to the predetermined watering schedule when there is no rain, in which case the sprinkler system delivers the desired amount of water following a predetermined number of days, n, without watering. In the preferred implementation of this embodiment, the recognition of a valid CallerID is received (i.e., turn the system ON/OFF), the system automatically takes the phone off-hook momentarily then hangs up. This accomplishes two things. First, this prevents multiple, longer-term ringing of the phone, and secondly, pick-up and hang-up serves as a confirmation to the caller that the message was indeed received.

Modes of Operation

The sprinkler controller precisely controls watering by allowing or interrupting power to the sprinkler at desired times, based on historical and forecast rainfall and other weather information acquired by the Service Center. The interruption can be responsive to signals received at the Sprinkler Controller for ON/OFF operation, or in response to the Sprinkler Controller implementing a previously received watering schedule. Existing mechanical sprinkler systems (e.g., Intermatic: http://www.youtube.com/watch?v=xTONP3Z1Bf8) can operate in one of two modes of operation, ON and AUTO, as dictated by a switch setting on the sprinkler system hardware. Such modes can be simulated using electronic timers (e.g., RainBird: http://www.youtube.com/watch?v=kHisHSYWTu4). This invention can make use of either mode of operation for any style of controller, though the AUTO mode is preferred.

In the AUTO mode, the sprinkler system power controller inhibits watering by the sprinkler for any 24-hour period by interrupting power to the sprinkler system based the signals received from the Service Center. When the system has power, the daily sprinkler timing is controlled by the pre-existing sprinkler timer. The pre-existing sprinkler timer, whether it is electromechanical or programmable, will be set to water every day, and when power is supplied to the sprinkler system in this mode, watering will occur according to the schedule determined by the pins in an electromechanical sprinkler timer or by the schedule programmed into an electronic timer.

In an alternate embodiment, the sprinkler timer is set to the ON mode and causes the sprinkler system to water whenever there is power supplied to the sprinkler system. The sprinkler system power controller precisely controls watering by allowing or interrupting power to the sprinkler in accordance with the signals received from the Service Center. In another mode, a programmable timer can be programmed with multiple watering schedules, where each schedule has a selected watering time duration that can be selected. One or more of these schedules, in normal operation, can be run by the programmable timer to water accordingly (i.e. without the Sprinkler Controller disabling operation). This type of programmable timer, to work with the Sprinkler Controller, is programmed to run all programmed schedules every day, and the Sprinkler Controller selectively enables or disables the sprinkler solenoid(s) to effect the schedule it received from the Service Center, thereby imposing a desired watering schedule over the daily watering schedules programmed into the programmable timer. The pre-existing sprinkler timer never controls sprinkler timing; sprinkler individual zone watering is at all times controlled by timed signals or a schedule from the Service Center, and carried out by the Sprinkler Controller.

Example 1

This example pertains to an electronic programmable timer or an electromechanical timer set to AUTO (i.e., watering occurs according to the zone durations set by the pins). In this embodiment, the sprinkler timer schedule is set to water every day of the week and is identical for all days of the week.

The algorithm will either inhibit or permit watering based on historical and/or forecast weather information, and a signal is received from the Internet to open or close the switch in the Sprinkler System Power Controller. The switch closes when watering is desired. The switch opens to inhibit watering.

In order to maintain rotational synchronicity, power to the pre-existing timer is maintained even when power to the sprinklers is interrupted. In the case where a rain sensor is available or where the common wire is interrupted, inhibition of sprinkling for periods of 24-hrs is preferred since the pre-existing timer can be used for zone timing and only a single pair of ON/OFF signals would be needed when watering for any particular day.

Example 2

This example pertains to an electromechanical timer set to AUTO, where power to the home circuitry is interrupted. Operation is same as in EXAMPLE 1, except that power interruption must be for 24-hr. periods and zone timing is controlled by the pre-existing sprinkler timer. Power is interrupted to both the sprinkler solenoids and the electromechanical timer. Therefore, power interruption must be for 24-hr. periods so that the timer maintains rotational synchronicity with the 24-hr. cycle.

Example 3

This example pertains to an electromechanical timer set to ON (i.e., the sprinkler continues to water as long as power is supplied; when power is restored after it has been interrupted, the sprinkler indexes to the next zone and continues watering). In this embodiment, the timer settings of the existing sprinkler timer are not used. Instead, all timing is controlled by appropriate power ON/OFF signals sent to the Sprinkler System Power Controller.

In this mode of operation, the Service Center sends timed signals to water in accordance with the desired length of watering time for each zone. The system is initially sent a signal to interrupt power so that watering does not begin until the watering cycle is to start. At the beginning of the watering cycle, power is restored to the system to begin watering the first zone. A power interruption signal is sent at the end of the watering duration for that zone. After a brief interval of time to allow for zone termination, power is restored to the system, causing the system to index to the next zone and resume watering. This process continues until all zones have been completed and the final zone receives its termination signal and interrupts power. As a fail-safe measure, a daughter board that incorporates a timing circuit may be integrated in this embodiment to prevent the system from excess watering due to a communications failure.

As a fail-safe measure, a daughter board that incorporates a timing circuit may be integrated in this embodiment to prevent the system from excess watering due to a communications failure.

We claim:

1. A method for scheduling sprinkling of a sprinkler system at a geographic location, the method comprising the steps of:
    programming a controller of the sprinkler system with a repeating schedule that, without rainfall at the geographic location, repeats a repeating pattern of "n" consecutive non-sprinkling event days followed by a sprinkling event day, wherein "n" is at least 2;
    determining whether rainfall has occurred at the geographic location on one of the non-sprinkling event days before a sprinkling event day; and
    when it is determined that rainfall has occurred at the geographic location on one of the non-sprinkling event days, automatically shifting the repeating schedule so that the repeating pattern starts over beginning on a day after the one of the non-sprinkling event days that rainfall occurred, thereby ensuring that the geographic location receives either a sprinkling event or a rainfall event at least every n+1 days.

2. The method of claim 1, including the step of programming a timer of the sprinkler system to deliver a desired amount of water on a daily basis, wherein operation of the timer is overridden by the controller.

3. The method of claim 2, wherein:
    the timer of the sprinkler system is an electromechanical sprinkler system timer including a rotating dial with adjustable pins; and
    the pins are adjusted to deliver the desired amount of water every day.

4. The method of claim 2, wherein:
    the timer of the sprinkler system is an electronic sprinkler system timer including a programming interface; and
    the timer is programmed through the interface to deliver the desired amount of water every day.

5. The method of claim 2, wherein:
    the timer of the sprinkler system is an electronic sprinkler system timer including a programming interface enabling a plurality of different timing programs to be set for different watering zones; and
    the different timing programs are programmed through the interface to deliver the desired amount of water to each of the different watering zones on a daily basis.

6. The method of claim 1, wherein n is automatically and temporarily increased if a rain storm is forecast for the geographic location on the sprinkling event day.

7. The method of claim 1, wherein a sprinkling event day is automatically changed to a non-sprinkling event day based on a presence of a storm or storm track headed for the geographic location on the sprinkling event day.

8. The method of claim 6, wherein, if a forecast rain event does not result in rainfall occurring at the geographic location, n is temporarily reduced to zero so that the next sprinkling event day occurs on a next day and the repeating schedule is then shifted to re-start thereafter with n non-sprinkling event days.

9. The method of claim 1, wherein a timer of the sprinkler system, which operates independent of the controller, is capable of being programmed to deliver a desired amount of water in accordance with a predetermined fixed watering schedule comprised of watering zone start times and watering zone durations, the method further comprising the steps of:
receiving rainfall information on a daily basis associated with the geographical location of the sprinkler system, wherein the rainfall information is historical or forecast, to determine if a rain event is capable of providing the desired amount of water.

10. The method of claim 9, wherein the predetermined fixed watering schedule is delayed by one full day if the rain event is capable of delivering the desired amount of water.

11. The method of claim 9, wherein multiple no-rain fixed watering schedules are in effect for different daily time periods.

12. The method of claim 9, further comprising, wherein the repeating schedule is shifted if the rainfall information forecasts a high probability that the desired amount of water will be received as rainfall in the next 1 to 24 hours.

13. The method of claim 9, further comprising, wherein the repeating schedule is shifted if an area forecast indicates that there is a strong probability of a significant rain event in the next 24 hours, or if weather radar indicates an existing or oncoming storm.

14. The method of claim 9, wherein the rainfall information is a combination of historical and forecast information.

15. The method of claim 9, further comprising immediately shifting the repeating schedule upon the occurrence of a significant rain event.

16. The method of claim 9, wherein the rainfall information is radar-based.

17. The method of claim 9, wherein the rainfall information is derived through the Internet.

18. The method of claim 9, wherein the rainfall information includes soil moisture data associated with the geographic area.

19. The method of claim 9, wherein the rainfall information includes rain gauge data associated with the geographic area.

20. The method of claim 9, including the step of using zip code information to determine the geographic area associated with the sprinkler system.

21. The method of claim 9, wherein:
the sprinkler system has a rain sensor input, the method further comprising providing an interface to the rain sensor input to follow or shift the repeating schedule in accordance with the signal received to interrupt the sprinkler system.

22. The method of claim 9, the method further comprising sending the signal to shift the repeating schedule from a remote site to the sprinkler system using a dial-up telephone connection.

23. The method of claim 9, the method further comprising sending the signal to shift the repeating schedule from a remote site to the sprinkler system using a recognized phone number.

24. The method of claim 9, wherein:
the repeating schedule has the form: do not water for x days, then water on the next day; and
the shift of the repeating schedule has the form: do not water for x+n days, then water on the next day, where n is between 1 and 7.

25. The method of claim 9, wherein the desired amount of water, the repeating schedule, or both, are determined through empirical observation associated with the effectiveness of the sprinkler system.

26. The method of claim 9, wherein the desired amount of water, the repeating schedule, or both, are determined through soil type, vegetation type, climate or other information with the geographic area.

27. The method of claim 9, wherein a remote site controls a plurality of sprinkler systems in the same or different geographic areas.

28. The method of claim 1, wherein sprinkling by the sprinkler system is inhibited from a geographically remote site.

29. The method of claim 28, including the step of sending the signal to interrupt the sprinkler system through the Internet.

30. The method of claim 28, including the steps of:
sending the signal to interrupt the sprinkler system from a remote site to an electronic module at the location of the sprinkler system through the Internet; and
wirelessly transmitting the signal from the electronic module to the sprinkler system.

31. The method of claim 1, wherein the sprinkler system is inhibited by the controller interrupting electrical power to a solenoid of the sprinkler system.

32. The method of claim 1, wherein n is between 1 and 7.

33. A sprinkler system including a controller for delivering water to a geographic location, geographic area, comprising:
a repeating schedule that is followed when there is no rainfall at the geographic location and that repeats a pattern of "n" consecutive non-sprinkling event days followed by a sprinkling event day, wherein "n" is at least 2;
an input for receiving information regarding whether rainfall has occurred at the geographic location during the non-sprinkling event days, the information including the date of occurrence of the non-sprinkling event day on which rainfall occurred at the location; and
a processor programmed to automatically shift the repeating schedule in response to the information received at the input indicating rainfall has occurred or will occur so that the repeating pattern starts over beginning on a day after the date of occurrence of the rainfall, thereby ensuring that the geographic location receives either a sprinkling event or a rainfall event at least every n+1 days.

34. The system of claim 33, further including: an interface for receiving a signal to inhibit watering by the controller of the sprinkler system in accordance with the repeating schedule; and
wherein a timer of the sprinkler system is programmed to deliver a desired amount of water on a daily basis unless inhibited by the signal.

35. The system of claim 34, wherein the signal to inhibit the sprinkler system is sent from a geographically remote site.

36. The system of claim 34, wherein the sprinkler system is interrupted on a non-sprinkling event days.

37. The system of claim 34, wherein:
the time of the sprinkler system is an electromechanical timer including a rotating dial with adjustable pins; and the pins are adjusted to deliver the desired amount of water every day.

38. The system of claim 34, wherein:
the timer of the sprinkler system is an electronic timer including a programming interface;
and the timer is reprogrammed through the interface, responsive to the signal, to deliver the desired amount of water every sprinkling event day in accordance with the repeating schedule.

39. The system of claim 34, wherein:
the timer of the sprinkler system is an electronic timer including a programming interface enabling a plurality of different timing programs to be set for different watering zones; and the different timing programs are reprogrammed through the interface to deliver the desired amount of water to each of the different watering zones on a daily basis in accordance with the repeating schedule.

40. The system of claim 34, including apparatus to interrupt electrical power to the sprinkler system in accordance with the signal received.

41. The system of claim 34, wherein the signal to interrupt inhibit the sprinkler system is delivered via the Internet.

42. The system of claim 34, including an electronic module at the location of the sprinkler system interfaced to the Internet; and
wirelessly transmitting the signal to inhibit the sprinkler system from the electronic module to the sprinkler system.

43. The system of claim 34, wherein the signal to inhibit the sprinkler system is sent via a dial-up telephone connection.

44. The system of claim 34, wherein the signal to interrupt inhibit the sprinkler system uses a recognized phone number.

45. The system of claim 33, wherein n is automatically temporarily increased if a rain storm is forecast for, or received, at the geographic location.

46. The system of claim 33, wherein a sprinkling event day is automatically terminated based on a storm or storm track headed for the geographic location.

47. The system of claim 33, wherein, when a forecast rain event does not result in rainfall occurring at the geographic location, n is automatically reduced to zero if it has already been the maximum number of sequential non-sprinkling event days since either the last rainfall or the last sprinkling event day.

48. The system of claim 33, further comprising a timer that operates independently of the controller and is programmed to deliver a desired amount of water in accordance with a predetermined fixed watering schedule comprised of watering zone start times and watering zone durations, and wherein the sprinkler system is intentionally programmed to deliver the desired amount of water every day unless interrupted by the controller in accordance with the repeating schedule; and wherein the rainfall information is historical or forecast, and wherein a significant rain event is a rain event capable of providing the desired amount of water.

49. The system of claim 48, wherein the predetermined fixed watering schedule is delayed by at least one full day if the rainfall information indicates a significant rain event.

50. The system of claim 48, wherein multiple no-rain watering schedules are in effect for different daily time periods.

51. The system of claim 48, wherein the predetermined fixed watering schedule is delayed if rainfall information indicates that the desired amount of water has been received in the last 1 to 7 days.

52. The system of claim 48, wherein the predetermined fixed watering schedule is delayed when the rainfall information forecasts a high probability that the desired amount of water will be received as rainfall in the next 1 to 24 hours.

53. The system of claim 48, wherein the predetermined fixed watering schedule is delayed if an area forecast indicates that there is a strong probability of a significant rain event in the next 24 hours, or when weather radar indicates an existing or oncoming storm.

54. The system of claim 48, wherein the rainfall information is a combination of historical and forecast information.

55. The system of claim 48, wherein the predetermined fixed watering schedule is immediately delayed upon the occurrence of a significant rain event.

56. The system of claim 33, wherein the rainfall information is radar-based.

57. The system of claim 33, wherein the rainfall information is derived through the Internet.

58. The system of claim 33, wherein the rainfall information includes soil moisture data associated with the geographic area.

59. The system of claim 33, wherein the rainfall information includes rain gauge data associated with the geographic area.

60. The system of claim 33, wherein Zip Code information is used to determine the geographic area associated with the sprinkler system.

61. The system of claim 33, wherein:
the sprinkler system has a rain sensor input; and including an interface to the rain sensor input operative to follow or shift the repeating schedule in accordance with the signal received to interrupt the sprinkler system.

62. The system of claim 48, wherein:
the repeating schedule has the form: do not water for x days, then water on the next day; and the shift of the repeating schedule has the form: do not water for x+n days, then water on the next day, where n is between 1 and 7.

63. The system of claim 48, wherein the desired amount of water, the repeating schedule, or both, are determined through empirical observation associated with the effectiveness of the sprinkler system.

64. The system of claim 48, wherein the desired amount of water, the repeating schedule, or both, are determined through soil type, vegetation type, climate or other information with the geographic area.

65. The system of claim 48, wherein at least the processor is located at a remote site to control a plurality of sprinkler systems in the same or different geographic areas.

* * * * *